(12) United States Patent
Krishnan

(10) Patent No.: US 11,863,902 B2
(45) Date of Patent: Jan. 2, 2024

(54) TECHNIQUES FOR ENABLING HIGH FIDELITY MAGNIFICATION OF VIDEO

(71) Applicant: Sony Interactive Entertainment Inc., Tokyo (JP)

(72) Inventor: Rathish Krishnan, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/571,337

(22) Filed: Jan. 7, 2022

(65) Prior Publication Data

US 2023/0224431 A1    Jul. 13, 2023

(51) Int. Cl.
| | |
|---|---|
| *H04N 7/12* | (2006.01) |
| *H04N 5/268* | (2006.01) |
| *H04N 5/262* | (2006.01) |
| *H04N 5/265* | (2006.01) |
| *H04N 19/136* | (2014.01) |
| *H04N 19/172* | (2014.01) |
| *H04N 5/77* | (2006.01) |

(52) U.S. Cl.
CPC ............ *H04N 5/268* (2013.01); *H04N 5/265* (2013.01); *H04N 5/2628* (2013.01); *H04N 5/77* (2013.01); *H04N 19/136* (2014.11); *H04N 19/172* (2014.11)

(58) Field of Classification Search
CPC ...... H04N 5/268; H04N 5/2628; H04N 5/265; H04N 19/136; H04N 19/172; H04N 7/77
USPC .................................................... 375/240.02
See application file for complete search history.

(56) References Cited

U.S. PATENT DOCUMENTS

| | | | |
|---|---|---|---|
| 9,300,858 B2* | 3/2016 | Sako .................... | H04N 9/7904 |
| 2002/0091738 A1* | 7/2002 | Rohrabaugh ......... | G06F 16/986 |
| | | | 715/205 |
| 2004/0252119 A1* | 12/2004 | Hunleth ................. | G06F 16/40 |
| | | | 345/698 |
| 2012/0242788 A1* | 9/2012 | Chuang ............ | G08B 13/19619 |
| | | | 348/E7.001 |
| 2015/0109436 A1* | 4/2015 | Chen ....................... | H04N 5/77 |
| | | | 348/143 |
| 2015/0271453 A1* | 9/2015 | Chuang ................. | H04N 25/41 |
| | | | 348/39 |
| 2016/0014335 A1* | 1/2016 | Chuang ................ | H04N 23/698 |
| | | | 348/36 |
| 2016/0027210 A1* | 1/2016 | The ....................... | G06T 19/006 |
| | | | 345/633 |
| 2017/0078574 A1 | 3/2017 | Puntambekar et al. | |

(Continued)

OTHER PUBLICATIONS

"International Search Report and Written Opinion", dated Feb. 10, 2023, from the counterpart PCT application PCT/US22/82508.

*Primary Examiner* — Gims S Philippe
(74) *Attorney, Agent, or Firm* — John L. Rogitz; John M. Rogitz

(57) ABSTRACT

Responsive to a zoom command when presenting a first video, a second video is combined with the first video and presented. The first and second videos are generated from substantially the same camera location as each other at substantially the same time with substantially the same resolution. However, the second video is generated by a physical or virtual lens having a field of view (FOV) smaller than the FOV of a physical or virtual lens used in generating the first video. The technique gives the appearance of zooming without loss of resolution.

29 Claims, 5 Drawing Sheets

(56) References Cited

U.S. PATENT DOCUMENTS

| | | |
|---|---|---|
| 2017/0094187 A1 | 3/2017 | Sharma et al. |
| 2019/0124349 A1* | 4/2019 | Kuusela ................. H04N 19/70 |
| 2019/0238612 A1* | 8/2019 | Xie ......................... G06T 15/20 |
| 2019/0364204 A1* | 11/2019 | Wozniak ............... H04N 19/184 |
| 2022/0295071 A1* | 9/2022 | Ji .......................... H04N 19/137 |

* cited by examiner

TECHNIQUES FOR ENABLING HIGH
FIDELITY MAGNIFICATION OF VIDEO

FIELD

The present application relates generally to techniques for zooming video without losing resolution.

BACKGROUND

As recognized herein, when zooming on video, at high levels of zoom the image becomes pixelated. This can be alleviated by providing video with exceedingly high resolution, but such video consumes excessive storage and bandwidth. There are currently no adequate solutions to the foregoing computer-related, technological problem.

SUMMARY

Accordingly, in one aspect at least one storage device that is not a transitory signal includes instructions executable by at least one processor to cause the processor to present a first video on a display, and responsive to a zoom command, combine a second video with the first video and present the second video combined with the first video on the display. The first and second videos are generated from substantially the same camera location as each other at substantially the same time and substantially the same resolution. However, the second video is generated by a physical or virtual lens having a field of view (FOV) smaller than a FOV of a physical or virtual lens used in generating the first video to give the appearance of zooming without loss of fidelity. Alternatively, the second video may be generated by a camera with a shorter focal length than the first video.

The zoom command may be a first zoom command and the instructions may be executable to present only the second video on the display responsive to continued input of the first zoom command or input of a second zoom command. In some examples the instructions can be executable to, responsive to continued input of the first zoom command or input of a third zoom command after the second zoom command, combine the second video with a third video and present the third video combined with the second video on the display. Here, the first, second, and third videos may be generated from substantially the same camera location as each other at substantially the same time and substantially the same resolution, although the third video is generated by a physical or virtual lens having a FOV smaller than the FOV of a physical or virtual lens used in generating the second video.

Indeed, the processor may access to fourth and fifth videos each having a successively smaller FOV than the immediately preceding video for use in continued input of zoom commands.

The display may be a head-mounted display (HMD) such as a virtual reality (VR) three-dimensional (3D) computer game display.

In another aspect, a method includes presenting a first video on a display in a wide-angle mode. The method includes, responsive to a zoom in command, presenting the first video in a standard angle mode, and responsive to a continued zoom in command, presenting the first video in a telephoto mode. Responsive to a continuing zoom in command, the method includes presenting a second video on the display in a wide-angle mode.

In another aspect, an apparatus includes at least processor programmed to present a first video on a display, and responsive to a zoom command, present a second video on the display. The second video is generated by a physical or virtual lens having a field of view (FOV) smaller than a FOV of a physical or virtual lens used in generating the first video and/or based on a shorter focal length than a focal length on which the first video is presented.

The details of the present application, both as to its structure and operation, can be best understood in reference to the accompanying drawings, in which like reference numerals refer to like parts, and in which:

DETAILED DESCRIPTION

Figure 1:
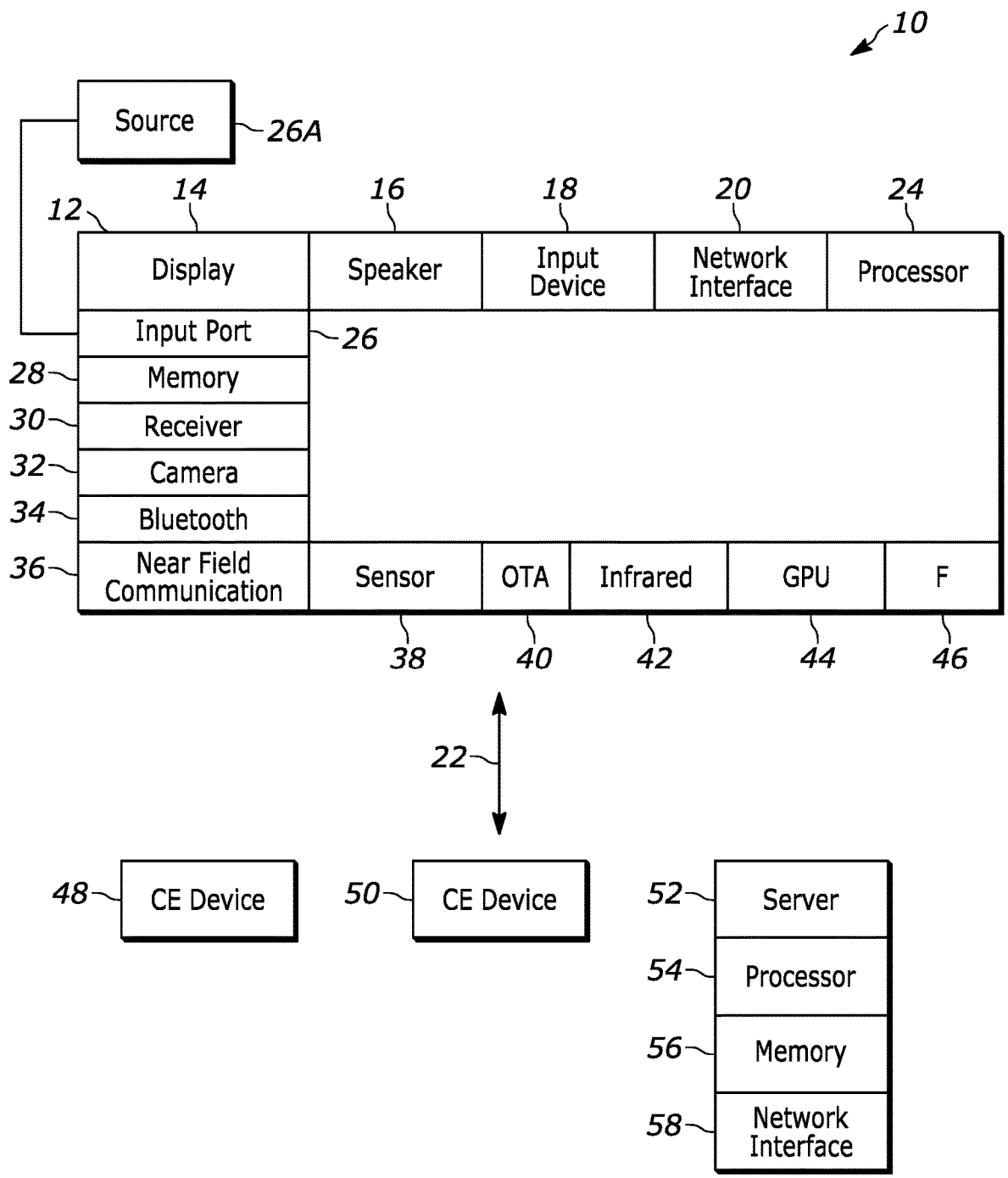
FIG. 1 is a block diagram of an example system in accordance with present principles.

This disclosure relates generally to computer ecosystems including aspects of consumer electronics (CE) device networks such as but not limited to computer game networks including wireless networks running on 5G or ATSC 3.0. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage mediums 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)) that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. Any user interfaces (UI) described herein may be consolidated and/or expanded, and UI elements may be mixed and matched between UIs.

Figure 2:
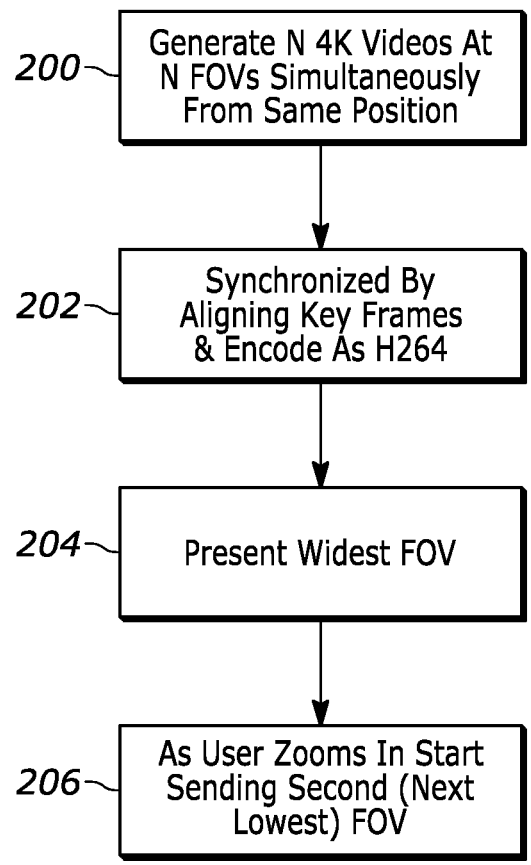
FIG. 2 illustrates example logic in example flow chart format consistent with present principles.

FIG. 2 illustrates that in an example, "N" videos are generated by respective virtual or physical cameras and associated physical or virtual lenses. N may be an integer equal to or greater than two. In one example, N equals five.

In one example, each of the N videos has the same resolution such as but not limited to 4K. However, in other examples the N videos may not all have the same resolution.

In any case, in one embodiment the videos may be taken from the same or substantially the same location at the same or substantially the same time. By "substantially the same location" is meant within the constraints of physically locating two cameras, for example, in the same place—the cameras may be closely juxtaposed albeit separated by the widths of the camera housings. By "substantially the same time" is meant at the same real or virtual time or within a few seconds of each other.

However, a first video is generated using a physical or virtual lens having a first field of view (FOV), the second video is generated a physical or virtual lens having a second FOV that is smaller than the first FOV, and so on, with each successive video being generated with successively smaller FOVs than the preceding video in the chain. Each FOV, however, may be centered on the same location or point or center. Note that in addition to or in lieu of successively smaller FOVs, the physical or virtual cameras may have successively shorter focal lengths.

Moving to block 202, the videos are synchronized with each other by, for instance, aligning key frames of each video with each other and in a specific example encoding the videos as H264. Alignment is described further below.

When a user desires to play a video, it is presented at block 204 using the first video, i.e., the video with the widest FOV. As the user zooms in at block 206 using an input device or by moving his head along the Z-axis when wearing a HMD presenting the video, the video with the next-smaller FOV is combined with the first video and eventually supplants the first video. Continued zooming results in successive videos with successively smaller FOVs being presented such that zooming is emulated without loss of fidelity. Thus, during playback, the content from the telephoto camera is inset into the content from the wide-angle camera according to pre-calculated alignment metrics, to create the perception of viewing a single video. Due to the precise alignment, it is not obvious to the viewer that there is an inner video displayed within the outer video.

Figure 3:
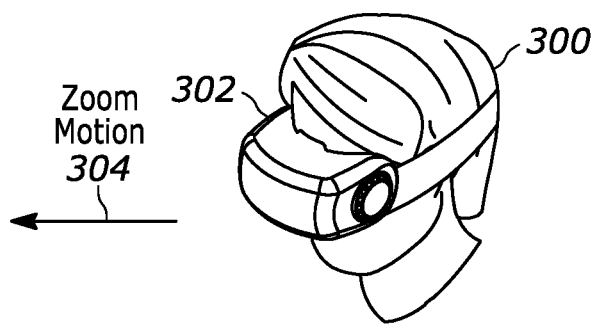
FIG. 3 illustrates a user zooming by means of moving forward along the Z-axis.

FIG. 3 illustrates a user 300 wearing a HMD 302 zooming by moving in along the Z-axis 304.

Figure 4:
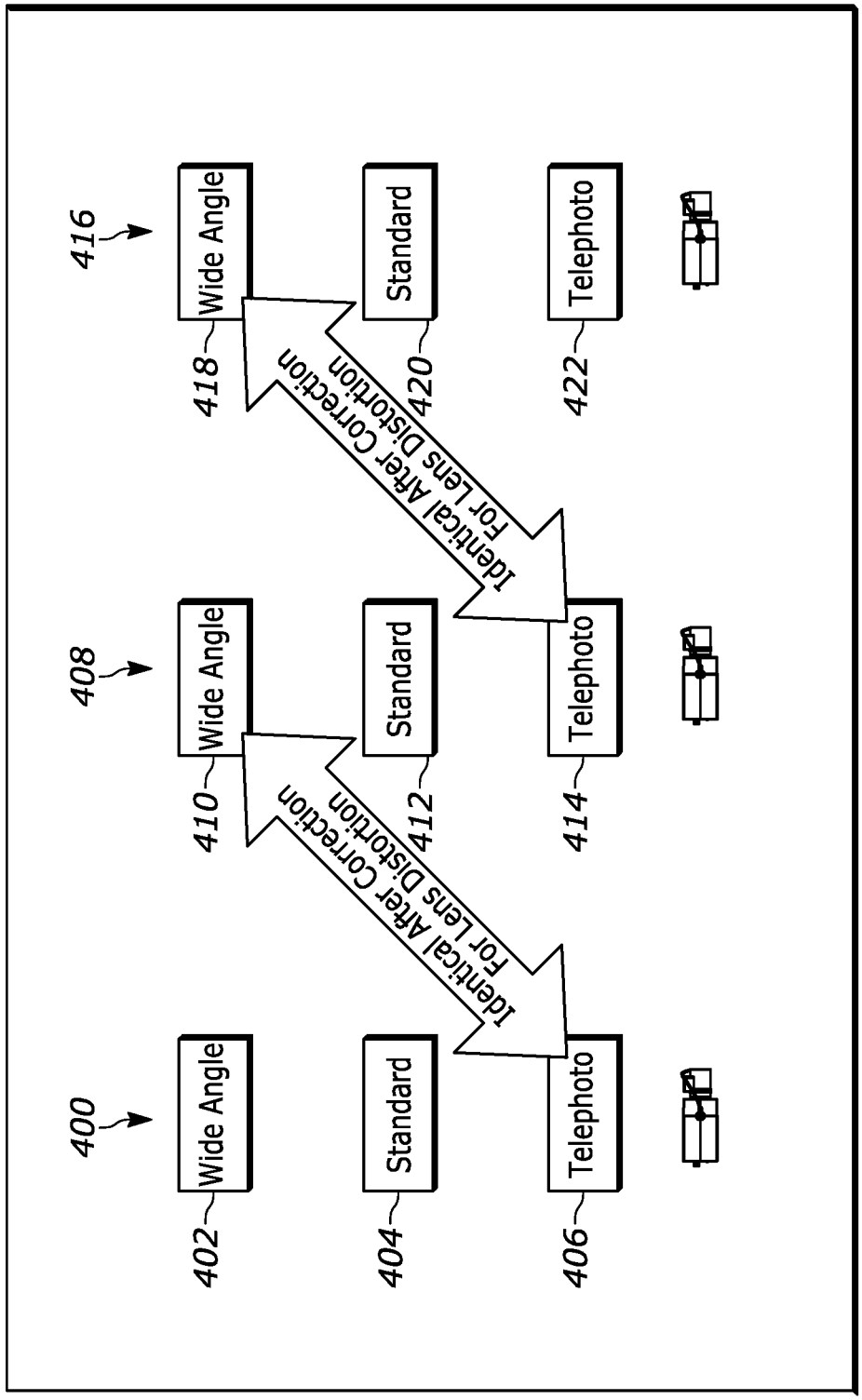
FIG. 4 schematically illustrates zooming.

FIG. 4 illustrates still further. Note that FIG. 4 illustrates an implementation in which a scene is captured at different locations in addition to using different FOVs, whereas FIG. 6 described below illustrates the case where more than two videos are captured from the same location. In greater detail, in the example shown for FIG. 4, plural (e.g., three) lenses are used with different FOVs to capture three videos from the same real or virtual camera position, and the same three lenses with respective different FOVs are used to capture three videos from a second position. Thus, after recording, six videos are captured simultaneously.

A first video 400 is shown with its widest-angle mode 402. As the user zooms in, the video is shown with its standard angle mode 404 and eventually, under continued zooming, with its telephoto mode 406, with each mode filling the display. It is to be understood that the transitions between the three modes shown are continuous and gradual as the user zooms, with only three general modes shown for simplicity.

When zooming in the telephoto mode 406 of the first video has reached a threshold limit, further zooming results in combining the first video with a second video 408 in its widest-angle mode 410. It is to be understood that the second video 408 may eventually or immediately supplant the first video entirely as zooming proceeds from the telephoto mode 406 of the first video to the wide-angle mode 410 of the second video 408.

As the user continues zooms in, the second video 408 is shown with its standard angle mode 412 and eventually, under continued zooming, with its telephoto mode 414, with each mode filling the display.

Continued zooming from the telephoto mode 414 of the second video results in combining the second video with a third video 416 with its widest-angle mode 418. It is to be understood that the third video 414 may eventually or immediately supplant the second video entirely as zooming proceeds from the telephoto mode 414 of the second video to the wide-angle mode 418 of the third video 416.

As the user continues zooms in, the third video 416 is shown with its standard angle mode 420 and eventually, under continued zooming, with its telephoto mode 422, with each mode filling the display. Note that steps 408-422 are not available if the scene is captured only from a single position.

While FIG. 4 illustrates the use of three videos each being produced by physical or virtual lenses with successively smaller FOVs, it is to be understood the only two videos need be used, or more than three videos may be used consistent with the principles of FIG. 4.

Note that multiple videos each having progressively smaller FOVs may be generated for multiple likely areas of user focus. A central focal point may be used a baseline and then offsets in terms of distance and direction from that point can be used and sent as metadata to indicate when a user is focusing on a point separated from the central focal point by the offset. For each offset, a series of nested videos may be pre-computed, or may be computed on the fly for a particular focal point as a user focuses on the particular point. If a user happens to focus on a point for which no nested videos with progressively small FOVs exist, conventional magnification techniques may be used.

Heat maps of prior user focus on every scene may be used to determine which points in a scene should have a series of nested videos generated for them. Only videos of areas where a user is focused may be decoded.

Figure 5:
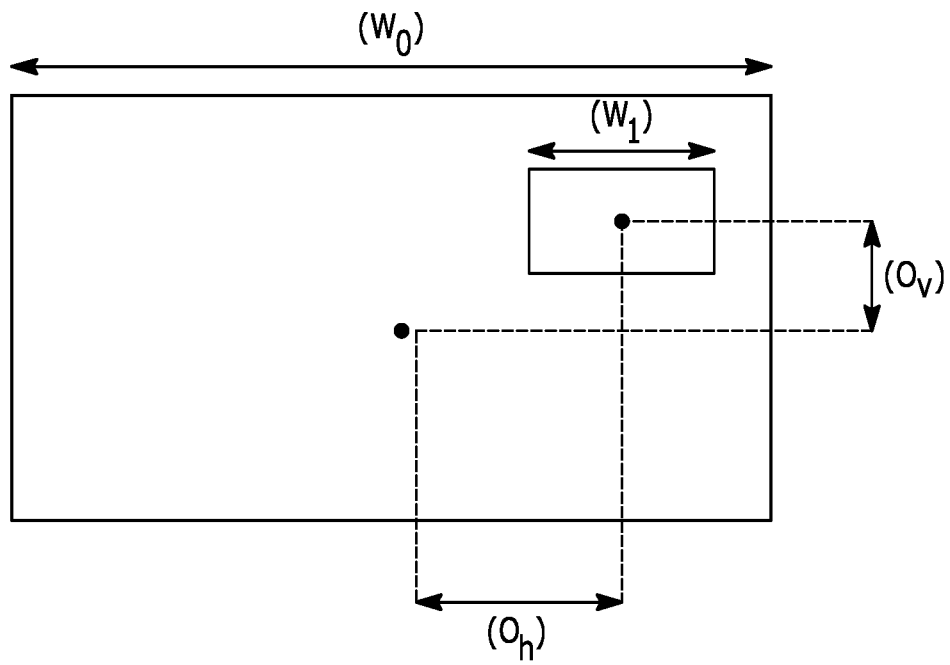
FIG. 5 schematically shows offsets between videos.

Refer now to FIG. 5 for a discussion of alignment metrics that may be determined prior to or during capture.

An inset ratio (R) can be determined to be the ratio of the number of pixels in the outer video (wider FOV) to the number of pixels in the inner video (narrower FOV) in a single dimension. In FIG. 5, W0 is the width in pixels of the outer video and W1 is the width in pixels of the inner video and after alignment, R=W0/W1. The Inset Ratio depends on the focal lengths of the two cameras, and the resolutions of the camera sensors.

A horizontal offset (Oh) is shown in FIG. 5 and is the horizontal offset of the inner video or ROI, measured from the center of the frame of the outer video. Similarly, a vertical offset (Ov) is the vertical offset of the inner video or ROI, measured from the center of the frame of the outer video.

FIG. 5 illustrates that the frames of the wider FOV and narrower FOV videos are aligned during display along with the alignment metrics using the offsets described above. Specifically, the camera position is determined and two cameras with different FOVs capture the same scene simultaneously. In the simplest case, Oh=Ov=0, where the ROI is the center of the video frame. An Inset Ratio of 2 could be achieved by using an FOV of 60 for the wide-angle lens and an FOV of around 32.2 for the telephoto lens. Disabling automatic features such as auto exposure for the cameras makes the blending of the two frames during display easier.

Figure 5A:
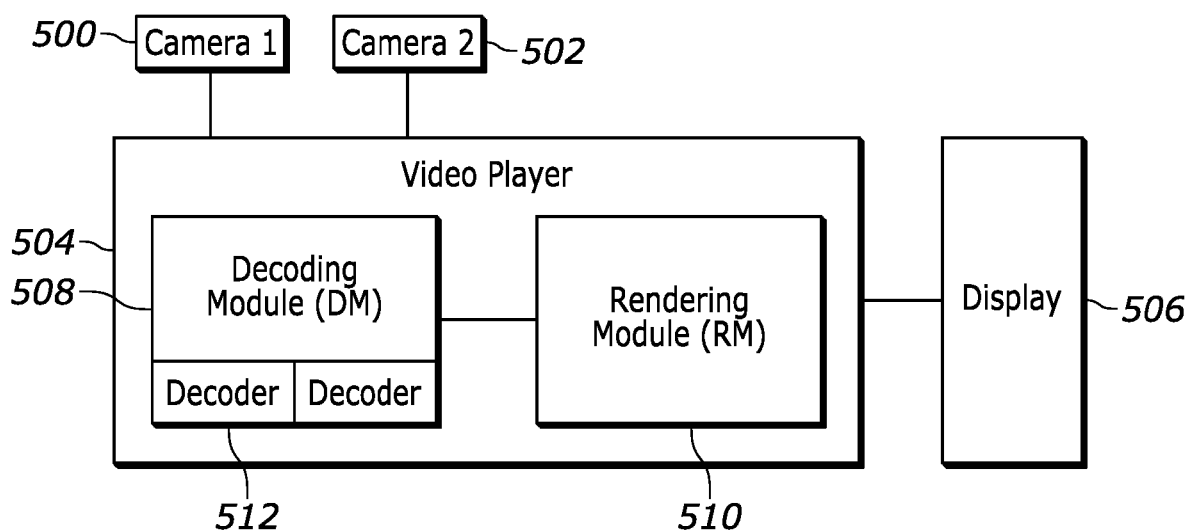
FIG. 5A is a block diagram of an example rendering module and decoding module.

Refer to FIG. 5A. The raw videos from the above two cameras, labeled 500, 502, are synchronized and encoded as two separate bitstreams. For this case, two decoders are used to decode both bitstreams simultaneously. In other embodiments that use one decoder, the video data from each camera could be compressed as a single bitstream, but independently decodable e.g., as HEVC tiles. In any case, the video player 504 which generates the output pixels for the display 506 includes a decoding module (DM) 508 and a rendering module (RM) 510. The DM in turn includes one or more decoders 512 capable of decoding the compressed bitstream(s). RM includes GPU shaders that can sample video textures and render it to the display.

The alignment metrics may be fixed, or could change with time. For the fixed case, the alignment metrics could be transmitted to the DM and/or RM only once. For dynamic alignment metrics, the DM and/or RM may be updated with each change of a metric. One way to achieve this is to pass the alignment metrics as metadata in the compressed bitstream. In other embodiments, the alignment metrics can be calculated automatically using motion estimation and image matching algorithms.

The video player which renders the decoded video data to the display accepts magnification control from the user using a device such as a mouse or a video game controller. The magnification level (ML) selected by the user is used to determine the portions of the outer and inner videos that are visible on the display. The system can place upper and lower limits for ML to avoid magnification levels that introduce picture quality degradation. When the user is zooming in, the value of ML increases and when the user is zooming-out, ML decreases. When ML increases, the number of visible pixels of the outer video decreases, and the number of visible pixels of the inner video increases. The GPU shaders of the RM use the value of ML, the alignment metrics, and the frame numbers of each bitstream for synchronization to create the perception of viewing a single video and not two separate videos. In other embodiments, an additional "feathering" step may be performed by the shaders to mask the boundary at the junction of the inner and outer videos.

When ML is small and the number of visible pixels of the inner video is low, the rendering of the inner video may be skipped without noticeable difference in picture quality of the displayed video. If the decoded video data of the inner video is not being displayed, decoding of the video data that will not be displayed may be eliminated, thereby improving the performance and efficiency of the system. One of the ways this can be achieved is by utilizing ML to determine which video bitstreams need to be decoded and rendering only the frames from the bitstreams that are being actively decoded. When the decoder is in the active state, the access units (AUs) of the bitstream are decoded normally and the decoded video data is sent to the RM for rendering to the display. When the decoder is in the inactive state, the decoding of an AU may be skipped partially or completely and the video data for the bitstream corresponding to the inactive decoder is not rendered to the display.

As ML changes, a decoder in the active state may become inactive and vice versa. While switching a decoder from an active state to an inactive state can be done immediately, switching from an inactive state to an active state may not be immediate. The reason for this is that a current AU may have dependency on a previous AU, and if the decoding of previous AU was skipped when the decoder was in an inactive state, the current AU may have errors when decoded. To avoid this problem, switching from an inactive state to an active state may be performed only when the current AU is a keyframe (IDR frame). To support this, a seeking state may be used in which, when ML crosses a threshold, a decoder in an inactive state switches first to a seeking state in which the decoder is waiting for an IDR.

When the current AU is an IDR, the decoder switches from the seeking state to an active state. The DM passes the bitstream IDs of the active decoders to the RM and passes an invalid ID to the RM for decoders in the seeking or inactive states. The RM uses these IDs to render only the valid pixels to the display.

For applications that require high magnification levels or smoother transitions from a zoomed-out view to a zoomed-in view, more than two camera views may be required. For such use cases, more than two cameras with varying degrees of focal lengths or FOVs may be used. As before, the same scene is captured using these cameras simultaneously from a single position.

Figure 6:
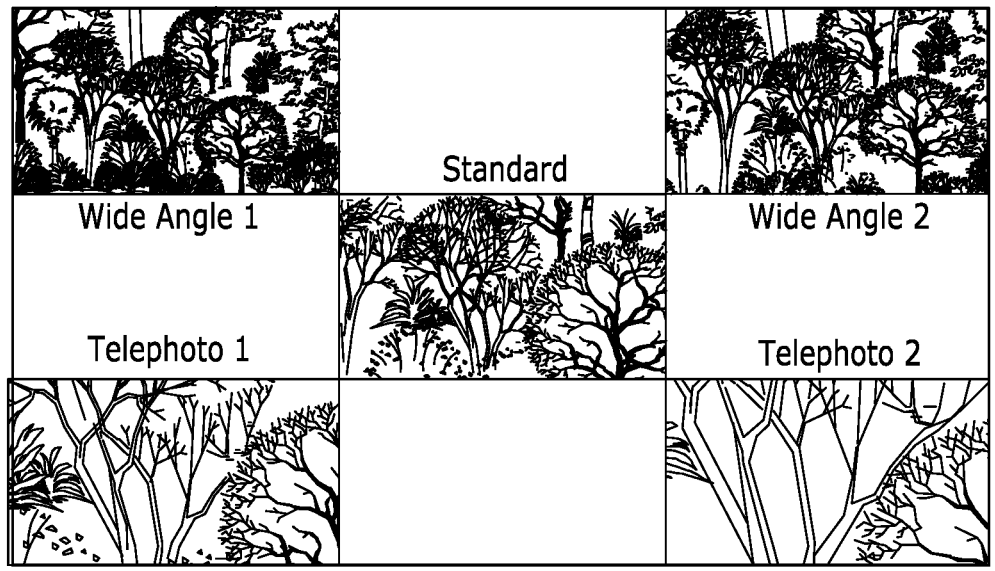
FIG. 6 illustrates views from five cameras.

An example of the views that could be captured using five cameras is shown in FIG. 6 (with the five views being labeled "wide angle 1", "wide angle 2", "telephoto 1", "telephoto 2", and "standard").

The video data from each camera in FIG. 6 may be synchronized and compressed as individual bitstreams or independently decodable sub-streams. While all these streams may be decoded simultaneously and selectively rendered according to the desired ML, a more efficient approach would be to decode only the streams that will be eventually displayed. The number of decoders needed in the DM can be equal to the maximum number of video streams that are rendered simultaneously at any instant. For a setup shown in FIG. 5 of one outer video and one inner video, the number of decoders needed can be limited to two even if more than two video streams are used. This is achieved using a strategy of 'stream switching' described below.

The streams that are to be processed by each decoder are determined by the value of ML. When the application is started, the first decoder (D1) can be processing the most wide-angle bitstream (B1) and the second decoder (D2) can be processing a second bitstream (B2), which has a lower FOV. As the user increases the ML, there will be a point beyond which the pixels of B1 are no longer rendered to the display. D1 then transitions to a seeking state and gets ready to decode the next bitstream in the view list (B3). The RM uses the bitstream ID passed from the decoder and the alignment metrics to display the decoded pixels of each bitstream at the right degree of magnification. When the RM detects a change in the bitstream IDs, it updates the rendering process to use the correct textures and sampling coordinates.

In other embodiments, the following steps can be taken during the encoding process to facilitate smooth stream switching.

First, the bitstreams use similar encoding configurations so that the same instance of the decoder can process AUs from multiple bitstreams without requiring extra memory. The IDRs of the different bitstreams can be aligned and evenly spaced according to how fast a user can increase or decrease the ML. Next, the IDR positions and AU offsets for each bitstream may be pre-calculated to avoid doing this in the DM.

In further embodiments, the DM may include one or more extra decoders to predict the next bitstream that will be processed based on ML and decode these streams prior to the decoded pixels being visible on the display. This strategy can help increase the rate of change of the ML. An alternative approach to achieve this is to encode the bitstreams using only IDRs.

Figure 7:
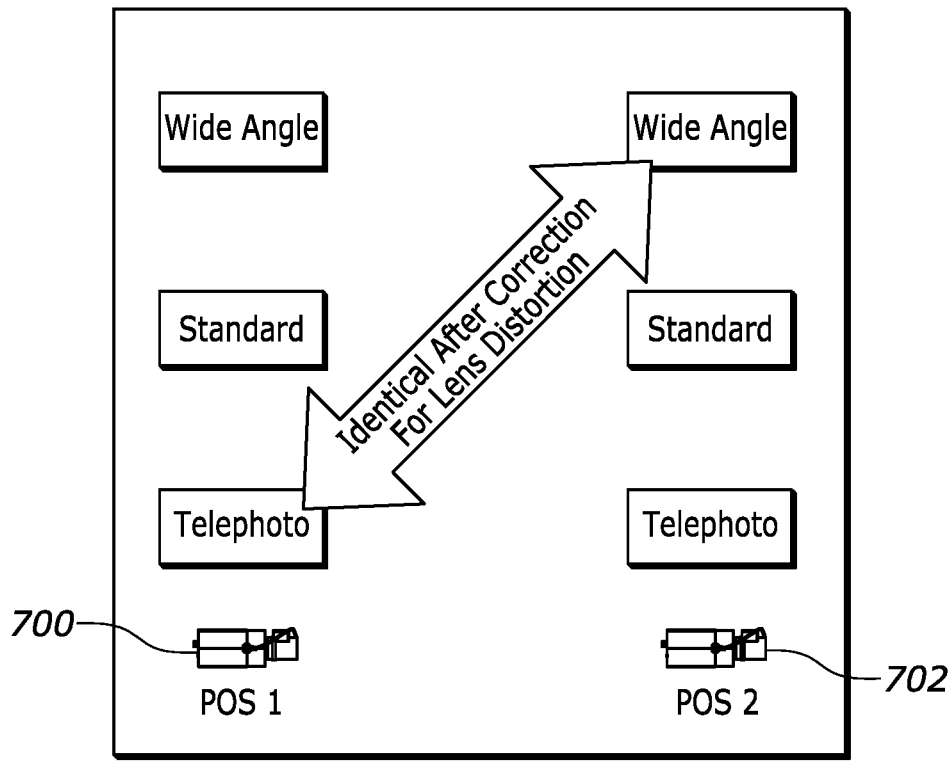
FIG. 7 illustrates multi-FOV and multi-position content capture.

Referring now to FIG. 7, an alternate technique for applications that require high magnification levels is multi-position content capture instead of multi-FOV content capture. Instead of capturing a scene from one position using cameras with different FOVs, the scene could be captured by using the same FOV but at different positions 700, 702 in the direction of scene capture. In other embodiments both multi-FOV and multi-position content capture can be employed together as shown in FIG. 7. In other embodiments, the RM may include a stage for distortion correction between multi-position or multi-view content. In other embodiments, the audio is also captured from different positions, and the audio stream is also switched according to the ML for a more immersive experience.

While the particular embodiments are herein shown and described in detail, it is to be understood that the subject matter which is encompassed by the present invention is limited only by the claims.

What is claimed is:

1. A device, comprising:
at least one storage device that is not a transitory signal and that comprises instructions executable by at least one processor to cause the processor to:
present a first video on a display; and
responsive to a zoom command, combine a second video with the first video and present the second video combined with the first video on the display, the first and second videos being generated from substantially a same camera location as each other at substantially a same resolution, the second video being generated by a physical or virtual lens having a field of view (FOV) smaller than a FOV of a physical or virtual lens used in generating the first video to give the appearance of zooming without loss of resolution.

2. The device of claim 1, wherein the first and second videos are generated using virtual lenses.

3. The device of claim 1, wherein the first and second videos are generated using physical lenses.

4. The device of claim 1, wherein the zoom command is a first zoom command and the instructions are executable to present only the second video on the display responsive to continued input of the first zoom command or input of a second zoom command.

5. The device of claim 4, wherein the instructions are executable to, responsive to continued input of the first zoom command or input of a third zoom command after the second zoom command, combine the second video with a third video and present the third video combined with the second video on the display, the first, second, and third videos being generated from substantially the same camera location as each other at substantially the same time and substantially the same resolution, the third video being generated by a physical or virtual lens having a FOV smaller than the FOV of a physical or virtual lens used in generating the second video.

6. The device of claim 5, wherein the processor has access to fourth and fifth videos each having a successively smaller FOV than the immediately preceding video for use in continued input of zoom commands.

7. The device of claim 1, comprising the display.

8. The device of claim 7, wherein the display comprises a head-mounted display (HMD).

9. A method comprising:
presenting a first video on a display; and
responsive to a zoom in command, presenting a second video on the display, wherein the method includes:
switching between respective bitstreams of the respective first and second videos at least in part by using encoding configurations so that a same instance of the decoder can process bitstream access units (AU) from multiple bitstreams, at least some key frames of different bitstreams being aligned and evenly spaced, key frame positions and AU offsets for each bitstream being pre-calculated.

10. The method of claim 9, comprising, after presenting the first video in a wide-angle mode, responsive to a first zoom command, presenting a video in a standard angle mode.

11. The method of claim 10, comprising, after a second zoom command following the first zoom command, presenting a video in a telephoto mode.

12. The method of claim 11, wherein the zoom command causing presentation of the second video is a third zoom command following the second zoom command, and the second video is presented in a wide-angle mode.

13. The method of claim 9, wherein the first video is generated using a lens with a first field of view (FOV) and the second video is generated using a lens with a second FOV that is smaller than the first FOV.

14. The method of claim 13, wherein the first and second videos are generated as if from cameras located in the same place and at the same time.

15. The method of claim 9, wherein the first and second videos are captured using a same camera field of view from respective first and second physical or virtual camera locations, respectively.

16. An apparatus comprising:
at least processor programmed to:
present a first video on a display; and
responsive to a zoom command, present a second video on the display, the second video being generated by a physical or virtual lens having a field of view (FOV) smaller than a FOV of a physical or virtual lens used in generating the first video and/or the second video being generated based on a shorter focal length than a focal length on which the first video is presented.

17. The apparatus of claim 16, wherein the first and second videos have substantially a same resolution.

18. The apparatus of claim 16, wherein the first and second videos are generated using virtual lenses.

19. The apparatus of claim 16, wherein the first and second videos are generated using physical lenses.

20. The apparatus of claim 16, wherein the zoom command is a first zoom command and the processor is programmed to present only the second video on the display responsive to continued input of the first zoom command or input of a second zoom command.

21. The apparatus of claim 20, wherein the processor is programmed to, responsive to continued input of the first zoom command or input of a third zoom command after the second zoom command, combine the second video with a third video and present the third video combined with the second video on the display, the first, second, and third videos being generated from substantially the same camera location as each other at substantially the same time and substantially the same resolution, the third video being generated by a physical or virtual lens having a FOV smaller than the FOV of a physical or virtual lens used in generating the second video.

22. The apparatus of claim 21, wherein the processor has access to fourth and fifth videos each having a successively smaller FOV than the immediately preceding video for use in continued input of zoom commands.

23. The apparatus of claim 16, the first and second videos being generated from substantially a same camera location as each other at substantially a same time.

24. The apparatus of claim 16, the first and second videos being generated from respective first and second camera locations distanced from each other.

25. The method of claim 9, comprising reducing computational power needed by selectively decoding only content in a video represented by at least one bitstream that will be visible.

26. The method of claim 9, comprising smoothly switching between the respective bitstreams so that the same instance of the decoder can process bitstream access units (AU) from multiple bitstreams without requiring extra memory, the at least some key frames of different bitstreams being aligned and evenly spaced according to how fast a user can increase or decrease the magnification level, the key frame positions and AU offsets for each bitstream being pre-calculated to avoid doing this in a decoding module.

27. The method of claim 9, comprising executing a decoding module (DM) comprising one or more extra decoders to predict a next bitstream that will be processed, decoding the next bitstream prior to decoded pixels from the next bitstream being visible on the display.

28. The method of claim 9, comprising encoding bitstreams associated with the videos using only keyframes.

29. The method of claim 9, comprising switching audio streams along with switching video when zooming.

* * * * *